United States Patent [19]

LaCoste

[11] 4,302,682

[45] Nov. 24, 1981

[54] OCEAN THERMAL ENERGY CONVERSION SYSTEM

[75] Inventor: Bernard L. LaCoste, Wilmington, Del.

[73] Assignee: Westinghouse Electric Corp., Pittsburgh, Pa.

[21] Appl. No.: 65,657

[22] Filed: Aug. 10, 1979

Related U.S. Application Data

[62] Division of Ser. No. 918,127, Jun. 22, 1978.

[51] Int. Cl.³ .......................... B01D 3/06; F03G 7/04; F01K 21/06
[52] U.S. Cl. ...................................... 290/1 R; 60/646; 60/657; 60/641.7; 203/4; 203/7; 203/11; 203/88; 203/DIG. 20
[58] Field of Search ................. 203/DIG. 4, DIG. 17, 203/DIG. 20, 4, 7; 415/144, 145, 28; 290/43, 52, 54, 1; 60/641, 646, 657, 641 B

[56] References Cited

U.S. PATENT DOCUMENTS

| | | | |
|---|---|---|---|
| 29,667 | 6/1978 | Harner | 415/28 |
| 2,006,985 | 7/1935 | Claude et al. | 203/DIG. 17 |
| 2,977,292 | 3/1961 | Ellsworth | 203/4 |
| 3,076,096 | 1/1963 | Bachmann | 290/54 |
| 3,638,428 | 2/1972 | Shipley et al. | 415/145 |

FOREIGN PATENT DOCUMENTS

686956  5/1964  Canada .................. 415/144

OTHER PUBLICATIONS

Weissberger, Ed.; Techniques of Organic Chemistry; vol. IV; 1965; p. 761.

Primary Examiner—J. V. Truhe
Assistant Examiner—Shelley Wade
Attorney, Agent, or Firm—F. J. Baehr, Jr.

[57] ABSTRACT

A power generation system and method of operation for generating electricity by utilizing temperature differences inherently present in the ocean between water near the surface and water from the ocean's depths. A pump provides relatively warm, surface ocean water to a flash evaporator where a portion of the water is flashed into steam. The steam is expanded through a subatmospheric pressure range turbine which exhausts into a condensing enclosure. The steam exhausting into the enclosure is condensed by relatively cold ocean water pumped thereinto. The turbine drives a generator and thus produces the electricity. The turbine speed and generator output are controlled by selectively introducing atmospheric air and relatively warm water into the exhausted motive steam flow. Such selective introduction into the exhausted steam flow of air and/or relatively warm water increases the absolute pressure at the turbine's exhaust end and thus reduces steam flow through the turbine. Adjusting regulating valves for the air and warm water flows in response to changes in turbine speed and/or generator load provides means for regulating the speed of the turbine and generating load.

1 Claim, 3 Drawing Figures

OCEAN THERMAL ENERGY CONVERSION SYSTEM

This is a division of application Ser. No. 918,127, filed June 22, 1978.

BACKGROUND OF THE INVENTION

1. Field of the Invention

This invention relates to open cycle power generation systems utilizing ocean water temperature differences and more particularly to means for controlling electrical output of the system.

2. Description of the Prior Art

Alternative power generation sources have recently been sought to augment present generation capacity. Solar energy has been found to have some advantages over more conventional power generation means. A serious disadvantage of solar energy has, heretofore, been the relatively high cost of the solar collectors required to gather the solar energy. A concept has recently evolved which utilizes the ocean surface water as the solar collector. This concept involves flashing relatively warm, surface ocean water into steam and expanding that steam through a turbine to a condenser where relatively cold, subsurface ocean water is utilized to condense the expanded steam and maintain a relatively low pressure within the condenser. Due to the small pressure range (less than 15 pounds per square inch), the specific volume of motive steam used in the power cycle makes the use of conventional turnbine inlet control valves and stop valves impractical due to the extremely large size required and the fact that normal flow losses passing through such valves may approach the cycle's total pressure drop.

An ocean thermal energy conversion configuration was illustrated in U.S. Pat. No. 4,087,975 which issued May 9, 1978. Such patent showed a general outline of the vessel which houses an ocean thermal energy conversion system, but suggested no means for controlling the generator output from such system.

U.S. Pat. No. 3,750,395, which issued Aug. 7, 1973, to Tapper et al and is assigned to the assignee of the present invention, illustrates a power generation system which includes stop valves disposed upstream from the turbine and vacuum breaking valves connected to the condenser. As previously stated, stop valves such as those illustrated in the aforementioned patent are impractical for use on the present invention. Similar schemes which utilize stop valves between the motive steam source and turbine in combination with vacuum breaking valves for conventional power generation systems are illustrated in U.S. Pat. Nos. 2,409,024 and 879,121 which respectively issued Oct. 8, 1946 and Feb. 11, 1908. An additional disadvantage of the prior art vacuum breaking schemes as applied to low pressure, open cycles is the atmospheric air venting being directed to the condenser. Disposition of such air inlet provides relatively slow pressure response since low pressure, open cycle condensers are frequently large vessels requiring a not insubstantial time for filling with air.

SUMMARY OF THE INVENTION

In general, an ocean thermal energy conversion system having a flash evaporator for vaporizing relatively warm ocean water supplied thereto, a subatmospheric turbine for expanding the steam supplied by the flash evaporator and converting the steam's expansion energy into mechanical energy, a condenser for condensing steam exhausted from the turbine by intermingling relatively cold ocean water with the exhausted steam, a generator driven by the turbine for generating electricity, and valves and associated apparatus for regulating the exhausted steam pressure prior to its entry into the condenser by introducing fluid thereinto. The pressure regulating means include valves for controlling atmospheric air intrusion into the condenser and valves for controlling the flow rate of relatively warm ocean water into the exhausted steam flow. The atmospheric air intrusion valves provide stop valve capability and are to be opened only when the turbine's rotor and associated generator's rotor are to be quickly decelerated. The valves for controlling warm ocean water flow into the exhausted steam flow replace conventional control valves normally situated upstream from the driving turbine. The relatively warm ocean water supplied to the condenser through the controlling valve is intermingled with the exhausting steam with the mixture thereof passing through the condenser from which it is drained back into the ocean. In a preferred embodiment of the present invention an accumulator is interposed upstream from the flow control valve on the warm water control line to maintain a reservoir of warm ocean water at a predetermined pressure. The accumulator's pressure may be selectively increased or decreased by filling the accumulator to a predetermined extent so as to compress an inert gas within the accumulator's enclosure.

BRIEF DESCRIPTION OF THE DRAWINGS

The objects and advantages of this invention will become more apparent from reading the following detailed description in connection with the accompanying drawings in which corresponding reference characters indicate corresponding portions throughout the drawings and in which.

DESCRIPTION OF THE PREFERRED EMBODIMENT

Figure 1:
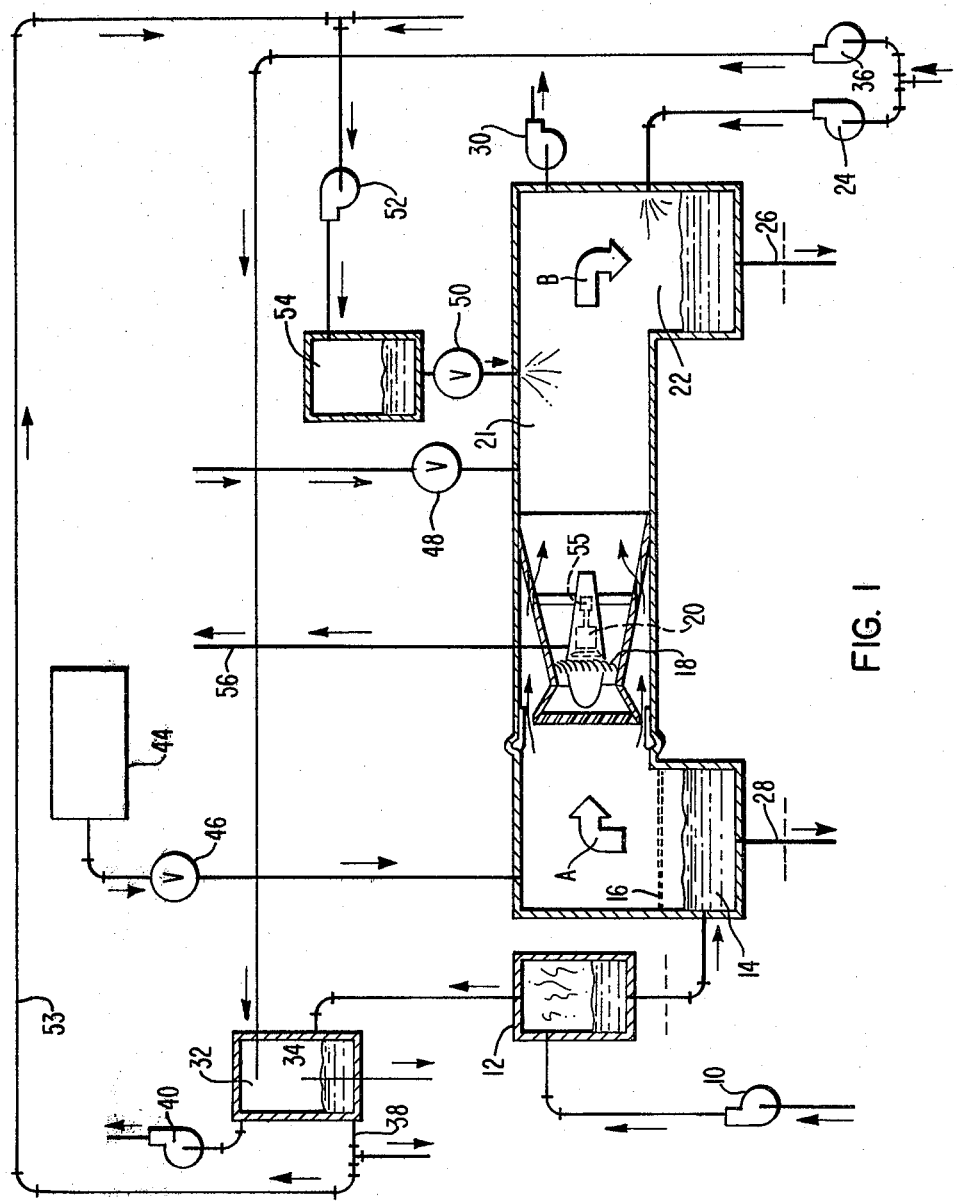
FIG. 1 is a schematic view of an ocean thermal energy conversion open cycle made in accordance with the present invention.

Referring now to the drawings in detail, FIG. 1 illustrates pump 10 which supplies relatively warm, surface ocean water to a deaerator 12 where most non-condensibles (e.g. air) are separated from the relatively warm ocean water. Water from the deaerator 12 is transmitted to flash evaporator 14 within which a portion of the warm water vaporizes into steam which passes through a mesh or other separator 16 and enters the high pressure end of turbine 18. Steam is expanded through turbine 18 and its expansion energy causes turbine 18 to rotate and thus drive generator 20. Steam from turbine 18 is exhausted through exhaust neck 21 into condenser 22. Exemplary macroscopic flow paths of entering and exhausting steam are illustrated by arrows A and B respectively. Exhaust steam from the turbine is condensed in condenser 22 by intermingling therein relatively cold subsurface ocean water supplied by pump 24. The relatively cold ocean water is schematically illustrated as being sprayed into condenser 22, but is to be understood that any intermingling means for mixing and/or exposing is exhausted steam to cold ocean water is considered within the scope of the present invention. The mixture of condensed steam and cold ocean water is returned to the ocean through orifice 26. Likewise, warm ocean water which did not vaporize into steam within flash evaporator 14 is returned to the ocean through orifice 28. Compressor 30, whose suction end is in fluid communication with condenser 22, evacuates non-condensible substances from the entire system's flow path to establish the low vacuum pressure levels required to initiate steam vaporization in flash evaporator 14 and subsequent steam flow through turbine 18 into condenser 22.

Non-condensibles removed from deaerator 12 are vented to deaerating condenser 32 where any water vapor contained therein is condensed on the exterior of heat exchanger tubes 34. Relatively cold ocean water is transmitted through tubes 34 by pump 36. Condensed water vapor may be drained from deaerating condenser 32 through drain 38 or utilized as later described. Compressor 40 removes non-condensible substances from within deaerating condenser 32 and vents them to the atmosphere.

During turbine shutdown, an inert gas, nitrogen, is supplied to the flash evaporator 14, turbine 18, and condenser 22 so as to purge the system of moist salt air and reduce or substantially preclude corrosion of those components. The nitrogen is preferably stored in pressurized tank 44 as a liquid whose access to the turbine 18 and associated apparatus is regulated by isolation valve 46.

Use of stop valves and/or control valves upstream from the turbine 18 is impractical since the volumetric flow rate of the utilizing steam is so large that the valve size necessary to regulate such steam flow would, by necessity, have to be extremely large. For applications, such as the illustrated OTEC power cycle, rapid flow control and interruption of steam flow through the turbine 18 plus the capability to absorb the kinetic energy of the moving parts at impact following a fast closing trip operation are essential operating requirements. Conventional valve sizes would be far beyond present technology in meeting these operating requirements due to their large inertia characteristics. Additionally, steam flow through such valves would experience a pressure drop, and since the pressure drop of the steam through the turbine in this subatmospheric open power generation cycle is a maximum of approximately 14.7 pounds per square inch, the percentage of pressure drop lost through such valves would be substantial and could make such power generation scheme economically unfeasible.

To avoid motive fluid flow through the stop and control valves, stop valve 48 is provided to regulate the flow of atmospheric air into steam exhaust neck 21 so as to maintain the pressure therein between 0 psi and atmospheric pressure. Control valve 50 regulates the flow of relatively warm water supplied by pump 52 to the interior of exhaust neck 21. While such warm water may be supplied from the ocean, the preferred source is salt-free condensate transmitted through conduit 53 from the deaerating condenser 32. Accumulator tank 54 permits storage of a large quantity of relatively warm water therein and provides instant response when valve 50 is opened. Trapping an inert gas such as nitrogen within accumulator 54 permits selective pressure maintenance on a reservoir of warm water. In response to the load on generator 20 or speed of turbine 18, control valve 50 is adjusted to establish a pressure within exhaust neck 21 which is proper for maintaining the desired steam flow through turbine 18. Pump 52 cycles on and off to maintain the pressure in accumulator 54 within a predetermined range. In essence the relatively warm water raises the temperature and thus the pressure within exhaust neck 21 and thus adjusts steam flow through turbine 18 from its downstream, rather than the upstream, side. Fast opening stop valve 48 permits fluid communication from the atmosphere to the interior of exhaust neck 21 and provides a more rapid means for interrupting or reducing the steam flow through turbine 18. Valves 48 are normally utilized to quickly interrupt the steam flow through the turbine so as to protect the turbine from overspeed and possible damage, when the electrical load is suddenly disconnected. Valves 48 are preferably located between the turbine exhaust and condenser inlet on exhaust neck 21. Valves 48 are normally closed and are preferably hermetically sealed with mechanical bellows attached to a moving valve stem and other associated stationary parts. When quickly opened, atmospheric air would be injected into the turbine's steam flow path and provide a pressure barrier to the subatmospheric pressure steam exhausting from turbine 18. Valve opening response and flow capacity for valves 48 are considered of design choice, but must be such that the resulting reversing torque levels do not exceed the mechanical stress limitations of the turbine blades, its rotor, and generator 20.

Figure 2A:
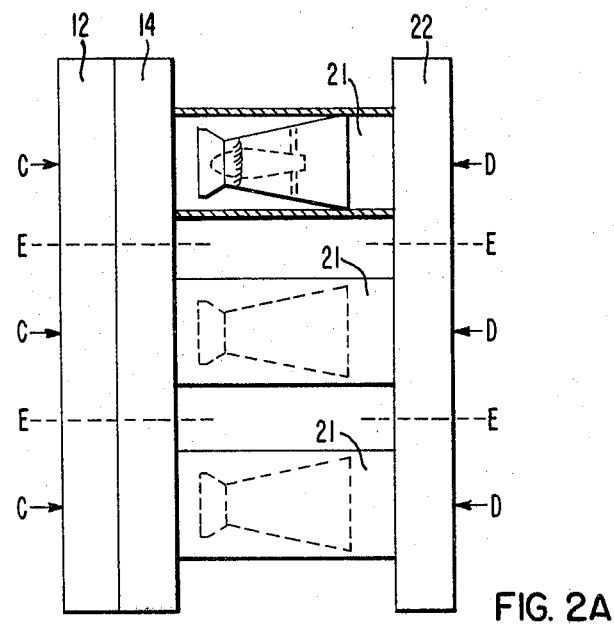
FIGS. 2A and 2B are plan views of modular components of the present invention.
Figure 2B:
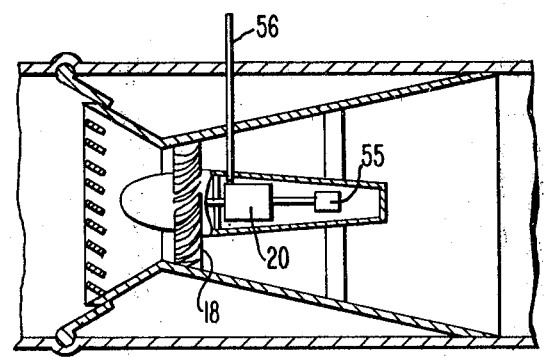

FIGS. 2A and 2B respectively illustrate a plan view of a module which includes deaerator 12, flash evaporator 14, three turbine-generator sets 18, 20, and condenser 22 and an enlarged, schematic view of the turbine 18, generator 20, and generator exciter 55. As better illustrated in FIG. 1, generator 20 and exciter 55 are sealed relative to the motive steam and vented through conduit 56 to the atmosphere. Relative warm water supplied by pump 10 is schematically illustrated in FIG. 2A as entering along the arrows designated as C while the relatively cold ocean water supplied by pump 24 is illustrated in FIG. 2A as entering condenser 22 along the arrows indicated as D. While three turbine-generator units are indicated for each module, any number could be used for each module and any number of modules could be utilized for the ocean thermal energy conversion system as a whole. By controlling the rate of relatively warm ocean water injected through valve 50 into the motive steam's flow path, it is possible to separately control the steam flow through each of the several modules, thus allowing speed or load control of the turbines in each module and part load control of the plant's overall output. Dividing the flash evaporator 14 and condenser 22 of each module into compartmental sections as indicated by dotted lines E—E would improve turbine flow control response and allow on-line maintenance on one submodule while others are in operation.

It will now be apparent that an improved ocean thermal energy conversion system has been provided in which steam flow and electrical output of turbine 18 and generator 20, respectively, are precisely controllable by spraying appropriate quantities of relatively warm ocean water into the flow path of the motive steam downstream from turbine 18 and upstream from condenser 22. Fast stopping capability for turbine 18 is provided by regulating atmospheric air intrusion into the motive steam's flow path downstream from turbine 18. As such, desired motive steam flow rate through the turbine is insured and overspeed protection of the turbine-generator 18, 20 is provided. Such control is provided *without* motive steam flow transmission through the stop valves 48 or control valves 50.

I claim:

1. An ocean thermal energy conversion system comprising:
   - a flash evaporator for vaporizing water supplied thereto into steam, said steam being at a lower pressure than said water, said evaporator including means for separating the resulting steam and unflashed water;
   - first means for pumping relatively warm ocean water to said flash evaporator;
   - an orifice in fluid communication with the flash evaporator for returning warm water to the ocean;
   - an orifice in fluid communication with the condensing means for returning water therefrom to the ocean;
   - a supply of inert gas for purging the evaporation turbine and condenser of moist salt air;
   - turbine means for expanding steam within a subatmospheric pressure range of less than 15 pounds per square inch and converting its expansion energy into mechanical energy, said turbine means having a steam inlet and a steam outlet, said steam inlet being in fluid communication with said flash evaporator and said steam outlet constituting a port through which expanded steam is exhaustible;
   - means for condensing steam exhausted from said turbine means, said condensing means including an enclosing structure which is in fluid communication with said steam outlet, said condensing means including an intermingling apparatus for mixing relatively cold ocean water with the exhausted steam within the enclosing structure to cause the steam to condense;
   - means for selectively providing fluid communication between the flash evaporator and the condensing means in bypassing relation with the turbine means;
   - second means for pumping relatively cold ocean water to said condensing means intermingling apparatus; and
   - means driven by said turbine for generating electricity.

* * * * *